Patented May 13, 1930

1,758,877

UNITED STATES PATENT OFFICE

ROBERT R. SLEEPER, OF BOUNDBROOK, NEW JERSEY, ASSIGNOR, BY MESNE ASSIGNMENTS, TO THE CALCO CHEMICAL COMPANY, INC., A CORPORATION OF DELAWARE

METHOD OF DYEING

No Drawing.   Application filed August 30, 1928.   Serial No. 303,115.

This invention relates to a method of dyeing and to compositions of matter for use in said method.

In dyeing fibres and fabrics, it is usually desirable to add to the dye bath a substance known as an assistant to facilitate the adsorption of the dye by the material. For this purpose, and particularly in the dyeing of wool, a mixture of sodium sulphate and sulphuric acid has been found particularly efficient. It has been customary to use commercially pure sulphuric acid and a commercially pure form of sodium sulphate, such as Glauber salt. A mixture of these materials causes effective adsorption of the dye and, because of their purity, in no way injuriously affects even the most sensitive dyes.

While sulphuric acid and Glauber salt have been found an effective assistant, they possess certain disadvantages. They are expensive, and the sulphuric acid is difficult and dangerous to handle.

An inexpensive substance having, in solution, the same essential chemical composition as a mixture of sulphuric acid and Glauber salt is the impure sodium acid sulphate, known as "crude sodium bisulphate", which is a residue in certain processes for the manufacture of hydrochloric acid and in the manufacture of nitric acid. In the latter case, the residue is usually termed nitre cake, but is recognized as being a form of crude sodium bisulphate and is to be understood as included in that term as used herein.

In view of the great economy which might thus be effected, it has been proposed to substitute crude sodium bisulphate for sulphuric acid and Glauber salt as an assistant in dyeing wool fibres and fabric; but, although its chemical effect in facilitating the adsorption of the dye is satisfactory, this substance has been found incapable of general use as an assistant in such dyeing owing to the fact that many commonly used dyes are sensitive to, and are discolored by, the impurities present in crude sodium bisulphate. Among such sensitive dyes are the following: alizarine blue SAP, $C_{14}H_8N_2O_{10}S_2Na_2$, Color Index No. 1054; alizarine cyanine green, $C_{28}H_{20}N_2O_8S_2Na_2$, Color Index No. 1078; patent blue A, $Ca(C_{37}H_{26}N_2O_7S_2)_2$. Color Index No. 714; violamine RB, $$C_{34}H_{24}N_2O_6SNa_2,$$

Color Index No. 758; acid violet 4B, $$C_{41}H_{44}N_3O_6S_2Na,$$

Color Index No. 698; fast light orange 2G, $C_{16}H_{10}N_2O_7S_2Na_2$, Color Index No. 27; azophloxine G, $C_{18}H_{13}N_3O_8S_2Na_2$, Color Index No. 31; azorubine AW, $C_{20}H_{12}N_2O_7S_2Na_2$, Color Index No. 179; acid fuchsine V, $$C_{16}H_{11}N_3O_7S_2Na_2,$$

Color Index No. 30; Pontamine lake red 4BL, and mixtures of the same. It has been proposed to remedy this difficulty by purifying the crude sodium bisulphate, but the expense of such purification is so great as to counteract the economic advantages in the use of this substance as an assistant in dyeing.

I have discovered that it is possible to effect the adsorption of sensitive dyes such as those above mentioned by means of crude sodium bisulphate without purification of the crude bisulphate. This is accomplished, in accordance with my invention, by permitting the impurities in the bisulphate to enter the dye bath and simultaneously neutralizing or counteracting their injurious effect upon the sensitive dye. The impurities in the crude sodium bisulphate may be prevented from discoloring sensitive dyes such as those above mentioned by adding to the dye bath, preferably simultaneously with the addition of the crude sodium bisulphate, any one of the following reducing agents: Oxalic acid, sodium sulfide, ferrous sulfate, aluminum powder, stannous chloride, zinc dust, carbon, glycerine, glucose, phenylhydrazine and its derivatives, hydroxylamines, and aldehydes. Of these, I have found oxalic acid to be the most desirable. The amount of the reducing agent added need be only a small proportion of the amount of crude sodium bisulphate used. The oxalic acid, or other one of the reducing agents mentioned, may be added directly to the bath when the crude sodium bisulphate is added; but, in order to provide an assistant available for general use, I find it more desirable to mix a small proportion of the reducing agent with the crude sodium bisulphate before they are added to the dye bath. In the case of oxalic acid and the other organic reducing agents mentioned, the mixture is effected by blending the substances in powdered form when cold. In the case of the metallic reducing agents mentioned, the agent may be added to the crude sodium bisulphate when the latter is in a molten state.

The following examples are cited as illustrative of my invention:

1. 99 parts of ground nitre cake and one part of oxalic acid are mixed thoroughly in a ball mill, or some other suitable mixing equipment, until a test of the mixture shows it to be uniform in composition. This mixture is then employed in place of Glauber salt and sulfuric acid in the dye bath.

In the case of wool to be dyed with dyes from an acid bath, ten per cent of the above mixture on the weight of the wool is added to the dye bath prepared with the requisite amount of a sensitive dye, such as patent blue A or one of the others above mentioned. The dyeing is then conducted at a temperature most suitable for the particular dye employed. As a rule, this is at or near the boiling point of the solution. No change takes place in the color of the dye under the above conditions. If, however, the nitre cake were used without admixture with the oxalic acid, the hue of the color would change.

Instead of oxalic acid, any one of the reducing agents above mentioned may be used in quantity sufficient to produce the desired effect.

2. 3 parts of stannous chloride are added to 97 parts of molten nitre cake and the mass allowed to cool. The mixture is then ground to a powder and used, as indicated in Example 1, as an assistant in dyeing.

3. The dye bath is prepared with any one of the sensitive dyes above mentioned, and there is added thereto from 5% to 10% on the weight of the fibre of nitre cake. Simultaneously there is added to the dye bath oxalic acid in quantity about one per cent of the nitre cake. This prevents any color change in the solution or in the color of the dyed fibre.

Instead of oxalic acid, any one of the other reducing agents above described might be used.

The above examples have been cited as illustrative of my invention and it is to be understood that they in nowise limit its scope.

What I claim is:

1. The method of dyeing fibres by means of a dye sensitive to the impurities contained in crude sodium bisulphate, which comprises assisting the adsorption of the dye on the fibres by means of crude sodium bisulphate, and simultaneously counteracting the effect on the dye of the impurities contained in the crude sodium bisulphate.

2. A dye bath comprising an aqueous solution of crude sodium bisulphate containing a dye sensitive to the impurities contained in crude sodium bisulphate and a substance counteracting the effect of said impurities on the dye.

3. A dye bath comprising an aqueous solution of crude sodium bisulphate containing a dye sensitive to the impurities contained in crude sodium bisulphate and a small quantity of a reducing agent counteracting the effect of said impurities on the dye.

4. A dye bath comprising an aqueous solution of crude sodium bisulphate containing a dye sensitive to the impurities contained in crude sodium bisulphate and containing oxalic acid.

5. A dye bath comprising an aqueous solution of crude sodium bisulphate containing a dye sensitive to the impurities contained in crude sodium bisulphate and containing oxalic acid amounting to about one per cent of the amount of crude sodium bisulphate.

6. As an assistant for use in dyeing, a composition of matter consisting of a major proportion of crude sodium bisulphate uniformly mixed with a minor proportion of a reducing agent.

7. As an assistant for use in dyeing, a mixture of a major proportion of crude sodium bisulphate and a minor proportion of oxalic acid.

8. An assistant for use in dyeing, comprising a uniform mixture of finely divided crude sodium bisulphate and finely divided oxalic acid in approximately the following proportions: crude sodium bisulphate 99 parts, oxalic acid 1 part.

9. An assistant for use in dyeing, comprising a mixture of nitre cake and oxalic acid.

In testimony whereof I have hereunto set my hand.

ROBERT R. SLEEPER.